United States Patent

Conzelmann et al.

[11] Patent Number: 5,194,800
[45] Date of Patent: Mar. 16, 1993

[54] POWER SUPPLY SYSTEM

[75] Inventors: Gerhard Conzelmann, Leinfelden-Oberaichen; Karl Nagel, Gomaringen; Andreas Junger, Reutlingen, all of Fed. Rep. of Germany

[73] Assignee: Robert Bosch GmbH, Stuttgart, Fed. Rep. of Germany

[21] Appl. No.: 602,292
[22] PCT Filed: Mar. 21, 1990
[86] PCT No.: PCT/DE90/00213
  § 371 Date: Nov. 16, 1990
  § 102(e) Date: Nov. 16, 1990
[87] PCT Pub. No.: WO90/12449
  PCT Pub. Date: Oct. 18, 1990

[30] Foreign Application Priority Data

Apr. 1, 1989 [DE] Fed. Rep. of Germany ....... 3910510

[51] Int. Cl.[5] .............................. H02P 9/30; H02J 7/16
[52] U.S. Cl. ..................................... 322/21; 322/28; 322/58
[58] Field of Search ............................. 322/21, 28, 58

[56] References Cited

U.S. PATENT DOCUMENTS 3,716,774  2/1973  Lace ................................... 322/28 X
4,335,344  6/1982  Gant .................................. 322/28 X
4,340,849  7/1982  Kuhn ................................. 322/28

Primary Examiner—R. J. Hickey
Attorney, Agent, or Firm—Michael J. Striker

[57] ABSTRACT

The power supply system for a motor vehicle, includes a battery; a three-phase generator; a connecting line connecting the terminals of the generator and the battery; a rectifier connected electrically to the generator; a voltage regulator for switching an exciter field of the generator on and off to control a voltage actual value at the generator terminals and producing an average field current in the exciter field to maintain a power supply voltage substantially constant regardless of load and speed; and a circuit device for determining and for partially compensating an undesirable direct voltage drop at the generator terminals resulting from a voltage drop in the connecting line caused by load current. The device for determining and for partially compensating is structured to determine an alternating voltage at the generator terminals produced by an alternating current component in the connecting line. The circuit device for determining and partially compensating the voltage drop can include an integrator connected to a full-wave rectifier and a function generator connected to the rectifier. The integrator, full-wave rectifier and function generator are connected in series between the generator terminals and the battery in the connecting line.

17 Claims, 3 Drawing Sheets

POWER SUPPLY SYSTEM

BACKGROUND OF THE INVENTION

The invention is directed to a power supply system including a battery, a three-phase generator, and a rectifier connected with the generator and whose voltage is limited by switching on and off the field current of the generator with a voltage regulator that determines the actual voltage of the voltage at the generator terminals and produces an average field current in the generator exciter field.

Conventional built-in regulators for three phase generators maintain constant the voltage at the terminals of the generator. However, the terminals of the battery are also decisive for the voltage of the power supply system. The voltage drop $U_R$ on the line may amount to up to 400 mV. If regulation to the battery voltage is to be effected, an additional line from the battery to the built-in regulator is required.

SUMMARY OF THE INVENTION

The object of the invention is achieved by providing means that approximately compensate the undesirable voltage drop at the generator terminals.

The object of the invention is a power supply system in which the additional line is not needed and the occurring direct voltage drop is determined by means of an "auxiliary variable" at the generator terminals and the actual value of the generator voltage is increased by the same amount at least in a zero approximation by the regulator.

On the one hand, the line from the generator to the battery comprises not only a direct current resistance, but also an alternating current resistance due to its inductance. Both are proportional to the length of the line. On the other hand, the rectified three phase current or alternating current, respectively, contains considerable alternating current components which are proportional to the flowing direct current. Since the battery constitutes a sufficient short circuit for the superposed alternating current component, the alternating voltage occurring at the terminals of the generator is proportional to the line length and to the flowing direct current.

The special advantage of the power supply system, according to the invention, consists in that this alternating voltage component is processed in a circuit and utilized for correcting the actual value predetermined by the voltage regulator.

The present invention both as to its construction so to its method of operation, together with additional objects and advantages thereof, will be best understood from the following detailed description of the preferred embodiment when read with reference to the accompanying drawings.

DESCRIPTION OF THE PREFERRED EMBODIMENT

Figure 1:
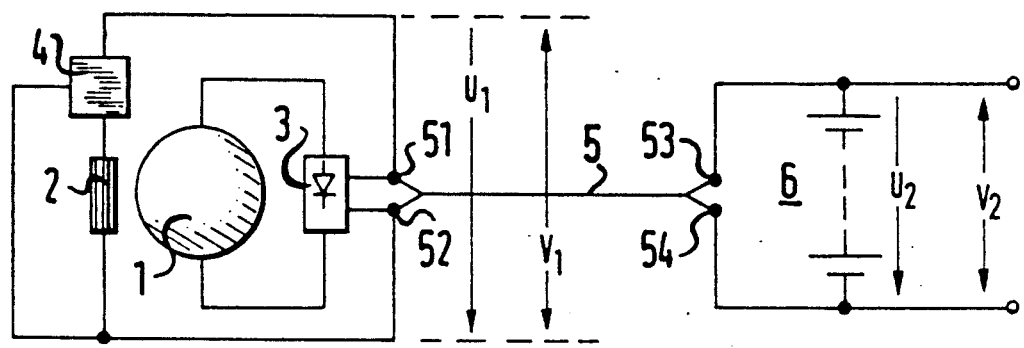
FIG. 1 shows a schematic view of a power supply system with three phase generator, rectifier, regulator, battery and the connection line with the corresponding variables according to the invention.

FIG. 1 shows a generator 1 with exciting winding 2, rectifier 3 and voltage regulator 4. Its positive terminal is designated by 51, its negative terminal is designated by 52. The line 5 connects the generator with the battery 6, whose positive terminal and negative terminal are designated by 53 and 54, respectively. The direct voltage at the terminals 51, 52 of the generator is designated by $U_1$ and the direct voltage at the terminals of the battery is designated by $U_2$; in a corresponding manner, $V_1$ and $V_2$ designate the occurring alternating voltage components.

The line comprises a resistance load per unit length $K_R$ and an inductance per unit length $K_L$. With line length l, the direct current resistance R and inductance L result, respectively, in $$R = K_R l \tag{01}$$

$$L = K_L l. \tag{12}$$

With respect to the flowing currents, I is the direct current component and i is the alternating current component. Accordingly, given $V_2=0$, the voltage drops on the line 5 and only the amount of the alternating voltage with angular frequency $\omega$ are of interest:

$$\Delta U = U_1 - U_2 = K_R l I \tag{02}$$

$$\Delta V = |\omega K_L l i|. \tag{12}$$

Both voltage drops accordingly depend proportionally on the current and line length. $\Delta V$ is still dependent on the circuit frequency $\omega$ and accordingly on the speed. This dependency can be eliminated by integration with an RC network, i.e. formally by multiplying by the operator ($\omega$ R C) Accordingly, the output voltage of the integrator $\Delta V_i$ is:

$$\Delta V_i = (R\ C)^{-1} K_L l i. \tag{13}$$

The output voltage $\Delta V_i$ of the integrator is accordingly, like $\Delta U$, proportional to the line length and direct current and accordingly its image.

A weakness of this arrangement consists in that the resistance load per unit length $K_R$ is inversely proportional to the square of the wire diameter d, while the inductance per unit length only decreases with ln a/d, i.e. practically remains constant. However, since it is also dependent on its environment, that is, dependent on placement, certain corrections can also be made easily. An additional ferromagnetic coating or addition of a discrete inductance is also suitable. But a clear advantage is provided even without corrections, as shown by the following example:

If $I_o$ is the nominal current of the generator, q is the value of the conductor which is allowable based on the current density, $\Delta U$ is the direct voltage loss occurring at a line length of 5 m, and $\Delta u$ is the voltage correction, according to the invention, then with the identical line arrangement and with a correcting element which is not adapted the error f is:

| I/A | q/mm² | dU/mV | dU/mV | f/mV |
|-----|-------|-------|-------|------|
| 150 | 35    | 400   | 400   | 0    |
| 50  | 10    | 455   | 155   | 300. |

Accordingly, even when $I_o = 50$ A in the installation, the allowable value of 400 mV is still not reached. Another possibility consists in that the corrections can be carried out so as to be variable within the circuit of the correcting element using known means, specifically either in the wafer test on the chip or subsequently on the finished product.

Figure 2:
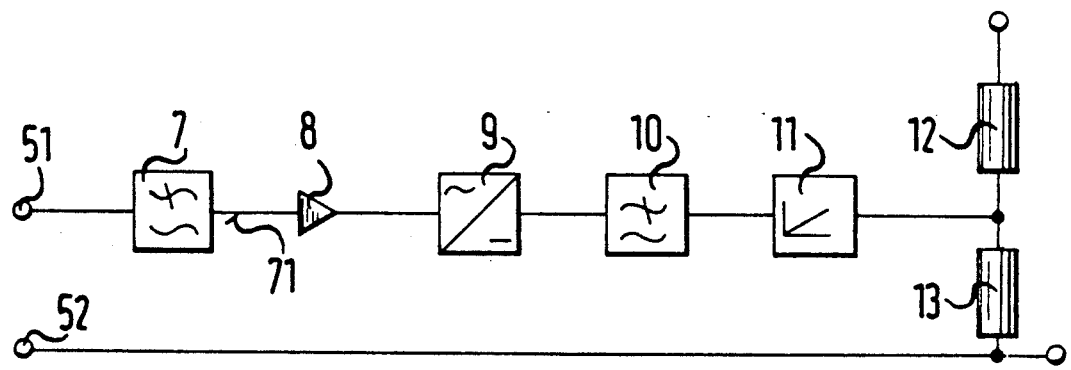
FIG. 2 shows a block wiring diagram of the evaluating circuit for correcting the actual value.

In FIG. 2, the integrator which is constructed as a low-pass filter is designated by 7, an amplifier is designated by 8, a rectifier by 9, another low-pass filter by 10, and a function generator by 11. Further, 12 and 13 are resistors, the component parts of the voltage regulator are designated by 4 and symbolize intervention for the voltage correction.

The alternating voltage component tapped at the terminals 51, 52 is integrated by of the low-pass filter 7, so that its output voltage 71 is independent of frequency and accordingly also of speed. If necessary, the latter is amplified by the amplifier 8 and rectified in the rectifier 9 and fed to the voltage regulator either directly or via another low-pass filter 10 and a function generator 11. The arrangement can supply an output voltage or an output current, as needed. The correction variable can act on the actual value side or on the reference voltage side of the voltage regulator. Its polarity is selected in a corresponding manner. The function generator enables additional corrections. Thus, the shortest line which is always present and the voltage drop occurring at the latter can be suppressed, the maximum possible correction can not only be limited, but can also be taken back during excessive wave voltage at the terminals 51, 52 which indicate a line break, a defective battery or the like. The function generator can be combined in a particularly advantageous manner with the rectifier by employing circuit technology.

Voltage regulators which meet present demands already comprise a low-pass filter at their input or an electronic circuit acting as a low-pass filter for smoothing the extremely high ripple voltage in systems for large currents. Another feature of the invention provides the use of this low-pass filter on the one hand as an integrator 7 for generating the speed-independent voltage $V_i$ and on the other hand also as low-pass filter 10

Figure 3:
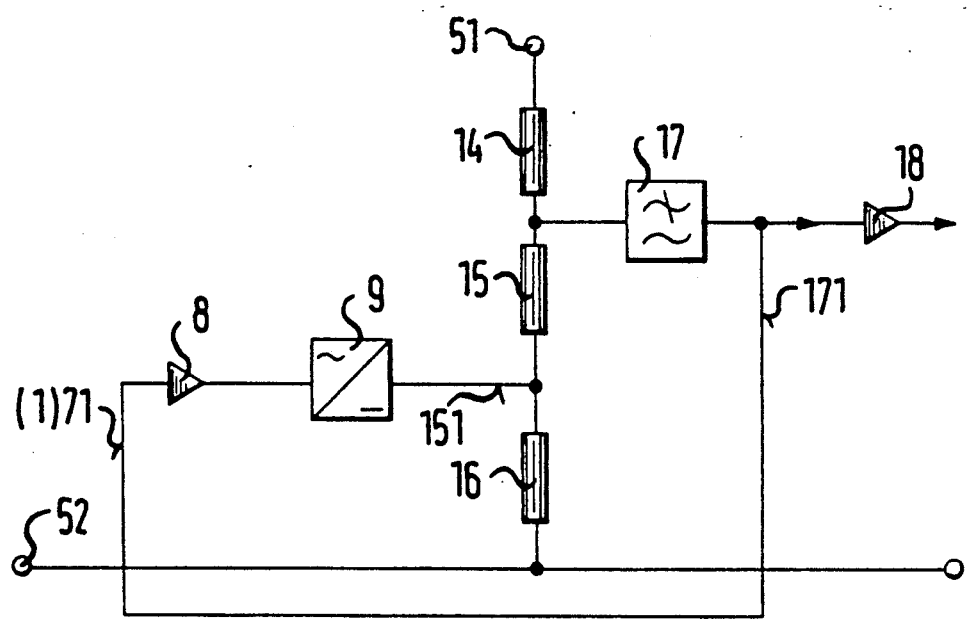
FIG. 3 shows a block wiring diagram of a regulator according to the invention.

In FIG. 3, resistors of the voltage divider at the input of the voltage regulator connected to the terminals 51, 52 are designated by 14, 15 and 16; its low-pass filter is designated by 17, and the amplifier connected subsequent to the latter is designated by 18. The output 171 of this low-pass filter is also connected with the input 71 of the amplifier 8 of the correction circuit. The rectifier delivers a ripple current which in this instance, for example, acts at the connection point 151 of the resistors 15, 16 and lowers the actual value with reference to the voltage regulator as the generator current increases, so that the potential of the terminal 51 increases by the same amount. The ripple voltage generated by the ripple current 151 of the rectifier at the voltage divider likewise passes through the low-pass filter, i.e. is smoothed, before it enters the amplifier input 18. The multiple use of the low-pass filter 17 is permissible, since the loop amplification kv is always sufficiently small toward I for the correction.

In a further step, the amplifier connected subsequent to the low-pass filter 17 of the voltage regulator can also be used as amplifier 8. As a result of this step, the cost for the entire correcting element is reduced to cost of rectifier 9. The rectifier itself is advantageously constructed as a full-wave rectifier, since the ripple voltage at its output chiefly has twice the frequency.

Figure 4:
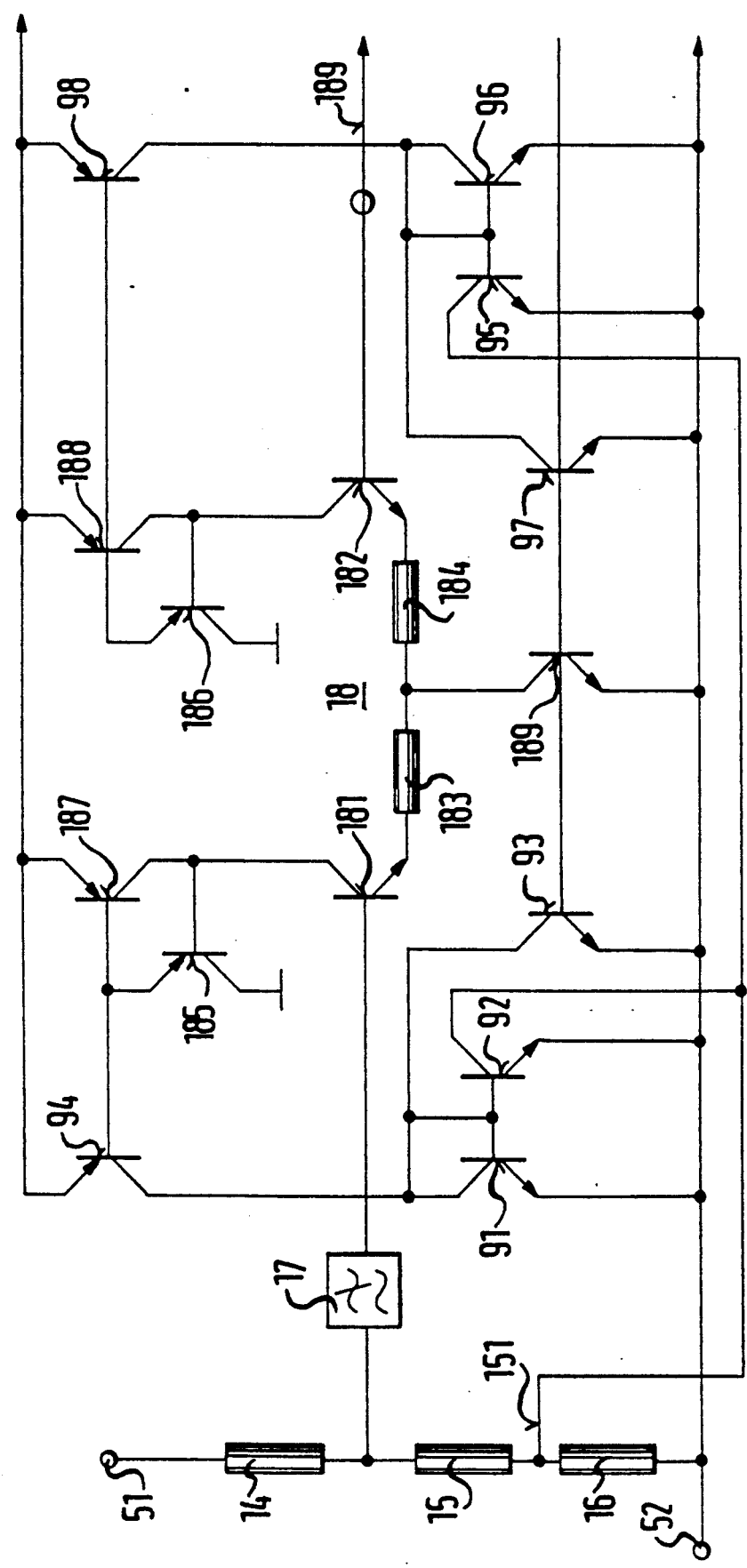
FIG. 4 shows a correcting element according to the invention and the voltage regulator including the correcting element.

FIG. 4 shows the circuit of an embodiment for a correcting element, according to the invention, and its realization in a voltage regulator. Only the elements 9n with $n = 1$ to 8 of the full-wave rectifier remain. All other components are components of the circuit of the voltage regulator. 14, 15 and 16 designate the voltage divider which is already known; 17 again designates the low-pass filter. The operational amplifier 18 comprises the transistors 181 and 182 as differential pair, the resistors 183, 184 in the emitters as current countercoupling for expanding the operating range, and the transistors 185, 187 and 186, 188 serving for decoupling. For the sake of clarity, the decoupling for the voltage regulator itself is no longer shown. The two inputs of the operational amplifier, i.e. the bases of the transistors 181, 182, are connected to the output of the low-pass filter 17 on the one hand and to the reference voltage 189 on the other hand. The PNP transistors 94, together with the transistors of the amplifier 185, 187 and the PNP transistor 98 with the transistors 186, 188 form a current mirror in each instance for the correction element, whose current is mirrored again in the NPN transistor pair 91, 92 and 95, 96, respectively. The two outputs of the NPN current mirror, i.e. the collectors of the transistors 92, 95, are combined and connected to the connection point 151. Thus, they supply the current for the correction. The NPN transistors 93 and 97 are component parts of a current bank of the regulator. Its collector current is drawn off from the collector current of the transistors 94 and 98, respectively. If the collector currents of the transistors 93, 94 and 97, 98, respectively, are adjusted so as to be equal by the dimensioning of the circuit when the differential voltage at the input of the amplifier 18 is "0", the collector current of the transistors 92, respectively, 95 is zero and no correction is effected. The effect of a full-wave rectifier occurs as a result of the symmetry of the left-hand transistor group 91 to 94 with the right-hand transistor group 95 to 98. As the residual ripple increases, i.e. as the generator current increases, the collector current of the transistors 92, 95 increases, the correction is effected.

If the correction is effected with a delay, i.e. when the generator current differs from zero, the collector currents of the transistors 93, 97 are to be adjusted higher. The rectifier accordingly obtains the character of a simple function generator. The dimensioning of the circuit is left to the discretion of the person skilled in the art. Thus, the current divider ratios which are determined in the NPN transistors by the number of emitters and in the PNP transistors by the number of collectors are not shown.

Built-in regulators have the disadvantage that the voltage regulator normally regulates to the terminal voltage of the generator and not to the voltage of the battery. In regulators which already comprise an input filter for improving the regulating characteristics, the invention at least makes possible a compensation of the voltage drop on the line from the generator to the battery in "zero approximation" with a minimum extra cost for integrated components. Accordingly, characteristics can be achieved which are currently to be obtained only with battery sensing, i.e. with an additional line from the regulator to the battery. If the power supply is included, a full compensation can also be achieved in practice.

We claim:

1. A power supply system for a motor vehicle, comprising a battery; a three-phase generator operable at a generator speed; a rectifier connected electrically to said generator; a voltage regulator for switching an exciter field of said generator on and off to control a voltage of said rectifier, said voltage regulator determining a voltage actual value at generator terminals of the generator and producing an average field current in the exciter field of said generator to maintain a power supply voltage substantially constant regardless of load and speed; and means for determining and for at least approximately compensating an undesirable direct voltage drop at the generator terminals resulting from a voltage drop in a connecting line connecting said generator with said battery and caused by load current therein, wherein said means are structured to determine an alternating voltage at the generator terminals, said alternating voltage being produced by an alternating current component in said connecting line, said connecting line having an inductance being approximately proportional to a length of said connecting line, said alternating current component being part of a rectified three-phase current produced by the generator and being proportional to a direct current.

2. A power supply system according to claim 1; wherein said means include an integrator for converting the alternating voltage proportional to the alternating current component and speed of the generator, into another alternating voltage, said other alternating voltage being substantially independent of the speed of the generator.

3. A power supply system according to claim 2, wherein said integrator comprises a low-pass filter.

4. A power supply system according to claim 3, wherein said low-pass filter is connected electrically to said voltage regulator for smoothing a ripple voltage.

5. A power supply system according to claim 2, further comprising an additional rectifier connected to said integrator and said other alternating voltage produced by said integrator is rectified by said additional rectifier.

6. A power supply system according to claim 5, wherein said rectifier comprises a full-wave rectifier.

7. A power supply system according to claim 5; further comprising means connected between said integrator and said additional rectifier for amplifying the other alternating voltage produced by the integrator.

8. A power supply system according to claim 1, wherein the additional rectifier produces an output direct voltage or an output direct current and said means for determining and for at least approximately compensating uses the output direct voltage or current for correcting the actual voltage value at the generator terminals.

9. A power supply system according to claim 2, further comprising another low-pass filter connected to the additional rectifier, and wherein the other low-pass filter produces a filtered output direct voltage or a filtered output direct current and said means for determining and for at least approximately compensating uses the filtered output direct voltage or current for correcting the actual voltage value at the generator terminals.

10. A power supply system according to claim 1, further comprising means for superposing an output voltage of the additional rectifier on the voltage actual value of the generator so as to bias the alternating voltage at the generator in such a manner that, with increase of the alternating voltage and, therefore, with increase of a generator current, a smaller voltage actual value is assigned to a part of said voltage regulator for maintaining constant the generator voltage so that the generator voltage increases by an amount corresponding approximately to the voltage drop in said connecting line.

11. A power supply system according to claim 1; wherein said means for determining and for at least approximately compensating comprises a function generator for providing a non-linear relationship between a generator current and one of an output voltage and output current of said means for determining and for at least approximately compensating.

12. A power supply system according to claim 1, wherein an inductance per unit length of said connecting line is changed according to a nominal generator current of the generator.

13. A power supply system according to claim 12, wherein the change of he inductance per unit length of the connecting line is effected by at least partial sheathing of said connecting line with a ferromagnetic coating.

14. A power supply system according to claim 13, wherein the change of the inductance per unit length of the connecting line is effected by changing a distance from said connecting line to a ferromagnetic part of the motor vehicle.

15. A power supply system according to claim 1, further comprising additional inductance means connected between the generator and the battery for optimal compensation of the voltage drop in said connecting line.

16. A power supply system according to claim 1; wherein the means for determining and for at least approximately compensating comprises at least a part of a monolithic integrated circuit.

17. A power supply system according to claim 16; wherein the monolithic integrated circuit also includes a control stage of said voltage regulator.

* * * * *